(12) United States Patent
Bauer et al.

(10) Patent No.: US 11,493,917 B2
(45) Date of Patent: Nov. 8, 2022

(54) REMOTELY OPERATING A MACHINE USING A COMMUNICATION DEVICE

(71) Applicant: TRUMPF Werkzeugmaschinen GmbH + Co. KG, Ditzingen (DE)

(72) Inventors: Klaus Bauer, Ditzingen (DE); Christian Goerg, Moeglingen (DE); Vinh Phuc Dinh, Wannweil (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 710 days.

(21) Appl. No.: 14/513,571

(22) Filed: Oct. 14, 2014

(65) Prior Publication Data

US 2015/0103180 A1 Apr. 16, 2015

(30) Foreign Application Priority Data

Oct. 15, 2013 (DE) .......................... 102013220832.4

(51) Int. Cl.
*G05D 1/00* (2006.01)
*H04N 7/18* (2006.01)

(52) U.S. Cl.
CPC .......... *G05D 1/0038* (2013.01); *H04N 7/183* (2013.01); *G05B 2219/24048* (2013.01); *G05B 2219/36167* (2013.01)

(58) Field of Classification Search
None
See application file for complete search history.

(56) References Cited

U.S. PATENT DOCUMENTS

| 7,769,492 | B2 | 8/2010 | Wang et al. |
| 2010/0131103 | A1 | 5/2010 | Herzog et al. |
| 2010/0228249 | A1* | 9/2010 | Mohr ..................... A61B 34/37 606/41 |
| 2010/0269046 | A1* | 10/2010 | Pahlavan .............. G06F 3/1462 715/740 |
| 2011/0043515 | A1* | 2/2011 | Stathis ................. G01C 15/002 345/419 |
| 2011/0046775 | A1* | 2/2011 | Bailey ....................... B07C 3/00 700/224 |
| 2011/0288684 | A1* | 11/2011 | Farlow ................... B25J 11/009 700/264 |
| 2012/0198222 | A1* | 8/2012 | Tukol ................. G06F 9/44505 713/2 |

(Continued)

FOREIGN PATENT DOCUMENTS

DE    102011083817 A1    4/2013

*Primary Examiner* — Michael J Hess
(74) *Attorney, Agent, or Firm* — Fish & Richardson P.C.

(57) ABSTRACT

Methods, devices and systems for remotely operating a machine using a communication device. In one aspect, a method includes generating images showing at least one operating range of the machine by using at least one camera of the machine, transmitting the generated images and an image of an operating surface of the machine to the communication device via a radio network, displaying at least one of: the operating surface image and at least one of the generated images on an operating display of the communication device, accepting machine operation commands input by an operator using the operating display, and then transmitting the machine operation commands via the radio network, thereby remotely operating the machine.

18 Claims, 1 Drawing Sheet

(56) References Cited

U.S. PATENT DOCUMENTS

| | | | | |
|---|---|---|---|---|
| 2012/0215380 A1* | 8/2012 | Fouillade | ............ | G05D 1/0038 |
| | | | | 701/2 |
| 2012/0248078 A1* | 10/2012 | Zediker | ................... | E21B 7/14 |
| | | | | 219/121.67 |
| 2013/0011234 A1* | 1/2013 | Pretlove | ................... | B25J 5/005 |
| | | | | 414/749.1 |
| 2013/0218336 A1* | 8/2013 | David | .................... | B25J 9/1671 |
| | | | | 700/248 |
| 2014/0035803 A1* | 2/2014 | Melkers | ................... | G05G 7/10 |
| | | | | 345/156 |
| 2015/0379785 A1* | 12/2015 | Brown, Jr. | ........... | A01B 79/005 |
| | | | | 701/29.1 |
| 2016/0176538 A1* | 6/2016 | Bekanich | ............... | B64D 45/00 |
| | | | | 701/14 |
| 2016/0179085 A1* | 6/2016 | Seitz | ................... | G05B 19/414 |
| | | | | 700/180 |

\* cited by examiner

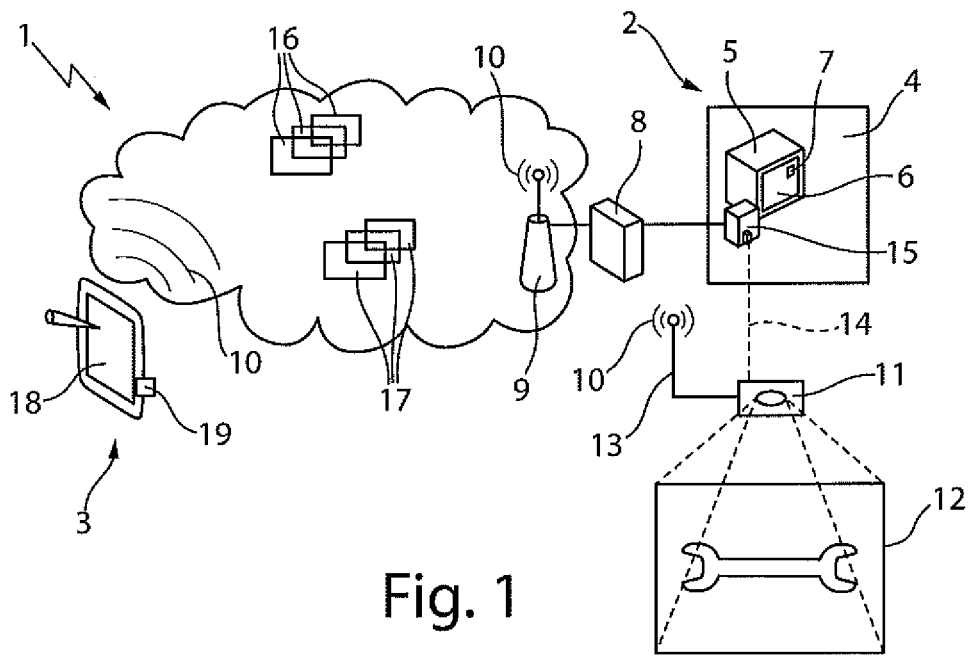
Fig. 1
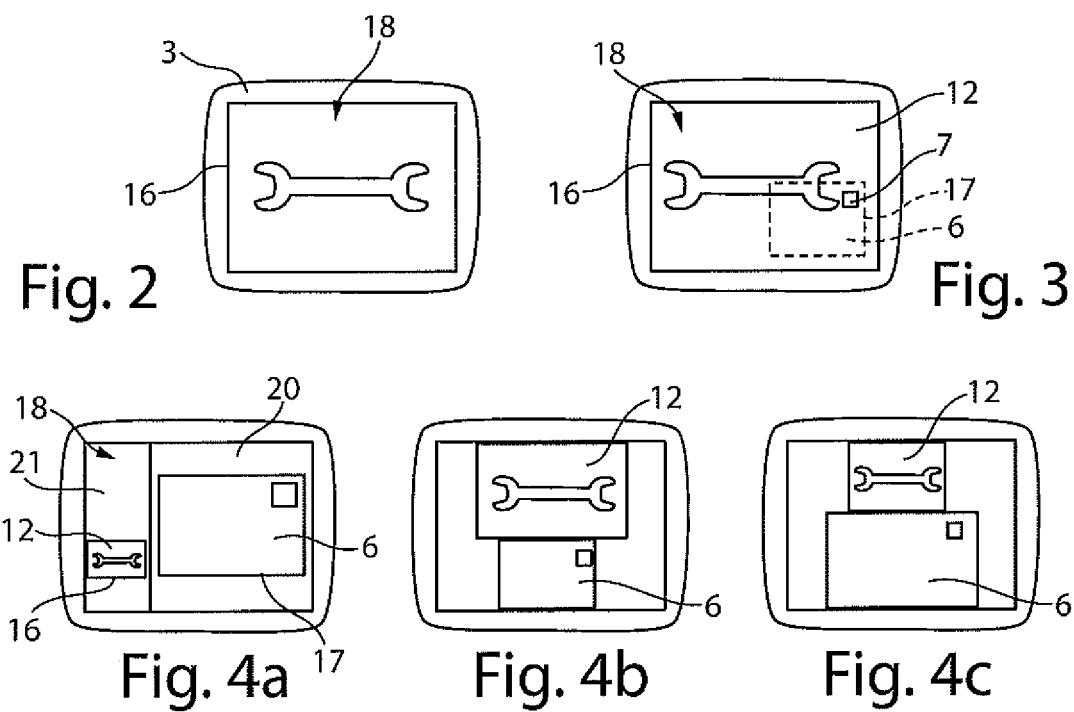
Fig. 2 Fig. 3
Fig. 4a Fig. 4b Fig. 4c
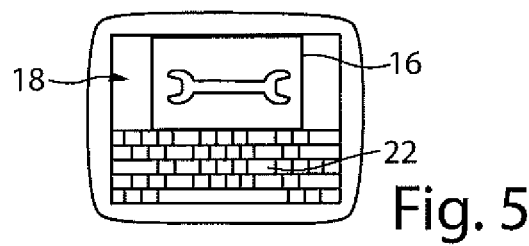
Fig. 5

REMOTELY OPERATING A MACHINE USING A COMMUNICATION DEVICE

CROSS-REFERENCE TO RELATED APPLICATION

This application claims priority under 35 U.S.C. § 119 to German Patent Application No. DE 10 2013 220 832.4, filed on Oct. 15, 2013. The contents of this priority application are hereby incorporated by reference in their entirety.

TECHNICAL FIELD

The invention relates to methods, devices and systems for remotely operating a machine using a communication device, more particularly, through a radio network.

BACKGROUND

DE 10 2011 083 817 A1 describes a method for constructing a wireless connection between a machine and a communication device via output and input of access data to/from a local radio network.

During the maintenance, fault diagnosis and where applicable also the repair of machines, installations and devices (combined below by the term "machines") by a service technician, it is often necessary, for example, to examine various functions of the machine or the operation of machine components, for the service technician to move from the normal operating position (for example, the operating console of the machine) to another machine position, in which he can examine the operational capacity or operating method of the machine. However, from this position, he cannot generally operate the machine in a regular manner, that is to say, using the operating console. Using a conventional communication device or remote control unit, the service technician may be able to operate the machine or machine components from this other machine position but since he may have no overview of the machine as a whole or no free view over other relevant machine components from this position, the movement, for example, of machine components using such a conventional remote control may involve danger for the service technician. If an additional assistant is called upon, there is the risk that the service deployment becomes inefficient and consequently economically unattractive.

SUMMARY

One aspect of the invention features a method for remotely operating a machine, in particular for maintenance and/or repair of the machine, using a communication device which is connected to the machine by means of a local radio network. The method includes: detecting at least one operating range of the machine using at least one camera of the machine, radio-transmitting the camera images detected and a machine operating surface on the communication device, displaying the camera images and/or the machine operating surface on an operating display device of the communication device, and remotely operating and/or remotely monitoring the machine using the operating display device. The method, the machine and the communication device can be configured to be provided by which effective, economical and risk-free maintenance and/or repair is/are possible.

Using this method, it is possible not only to operate the machine remotely (from different machine positions) using the communication device (remote control) but at the same time or in parallel also to view or monitor the operating range of the machine using the communication device (remote monitoring). It is thereby possible for repair and/or maintenance operations to be carried out by means of service technicians from different machine positions which differ from the regular operating position and from which there is otherwise, for example, no overview of the entire machine or no free view over other relevant operating ranges of the machine. This accelerates the repair and/or maintenance operations by the service technician and increases the reliability of the operations.

In some cases, not only can a single operating range of the machine be transmitted to the communication device by means of camera images, but it is also possible for a plurality of different operating ranges of the machine to be detected in each case by means of a camera and transmitted to the communication device in order to be displayed at that location. In this manner, the machine and the operating method thereof can, for example, be remotely monitored simultaneously from a plurality of viewing angles or it is possible to monitor remotely a plurality of different operating ranges simultaneously so that a repair or maintenance operation is possible in a more extensive and simpler manner. To this end, the service technician can position or arrange the plurality of cameras at the relevant machine positions in order to monitor the relevant operating ranges.

Using the method, it can be possible to more rapidly diagnose any faults which may have occurred owing to the increased overview or insight of one or more operating ranges of the machine. The method is advantageous not only for service technicians but also for regular operating personnel of the machine. It can also be used by a regular machine operator when he is working, for example, during set up or waste disposal operations at a machine position remote from the operating console or a remote operating range, but access to the information or control capabilities of the operating console and an indirect view of other operating ranges of the machine is still desirable.

As used herein, the term "operating range of the machine" is intended to be understood to be a range of the machine in which a machine function is carried out (for example, a movement of a machine component or the like). For example, the operating range may be an operating range of the machine in which the machine processes a workpiece. A machine display of a machine operating device does not constitute an operating range.

The machine can be operated via the machine operating surface indicated on the operating display device of the communication device. For example, inputs can be carried out by means of a keyboard illustrated on the operating display device (keyboard macros), by means of manually input finger movements (touch), by means of a mouse input (via mouse clicks) or via an input bar. The operating display device is preferably constructed as a touch screen (touch-sensitive screen). The communication device may, for example, be a tablet computer or a smartphone. The method can be implemented and called up in particular as a computer application on the communication device (application or App. for short).

The camera of the machine is typically a video camera, by means of which camera images are produced in a temporally sequential manner. The camera images consequently form the operating range at sequential times. The transmission of the camera images may in particular be carried out by means of an MJPEG stream (data flow in MJPEG format). The machine operating surface is also illustrated at temporally sequential times. Owing to the radio transmission of the camera images detected and the machine operating surface, the at least one operating range and the machine operating surface are transmitted directly (live) to the communication device. The radio transmission of the operating range and the machine operating surface is carried out via the local radio network. The local radio network is preferably a machine-integrated WLAN (wireless local area network). The transmission of the machine operating surface (generally the operating surface of an HMI (Human Machine Interface) PC) on the communication device is carried out by means of a suitable data protocol, in particular by means of VNC (virtual network computing).

In a preferred variant, the camera images and the machine operating surface are displayed as complete images on the operating display device. In this manner, the camera images transmitted and the machine operating surface are illustrated in the most extensive manner possible and the display region of the operating display device is used completely. The service technician consequently obtains a comparatively detailed display of the operating ranges and/or the machine operating surface. In order to display the transmitted camera images and the transmitted machine operating surface as complete images, it is possible to switch back and forth between a display of the camera images (in particular between camera images of different cameras in order to detect different operating ranges in each case) and the machine operating surface.

In another preferred variant, the camera images and the machine operating surface are displayed in a state at least partially superimposed on the operating display device. The operating range and the machine operating surface are then illustrated on the operating display device at the same time. This particularly facilitates the service and/or repair operations. The camera images (in particular camera images of different cameras) and the machine operating surface then overlap at least partially. It is in principle possible to display camera images of different cameras or the machine operating surface in the foreground or background of the operating display device. It is possible in particular to display the camera images of a first camera for detecting a first operating range of the machine and the camera images of a second camera for detecting a second operating range of the machine and accordingly other cameras or other operating ranges on the operating display device.

In another variant, the camera images and the machine operating surface are superimposed at least in a partially transparent manner. In this manner, in the region of the superimposition or overlapping, in spite of the overlapping a background display (either the operating range(s) or the machine operating surface) can still be monitored by the operator or the service technician. No information is lost and the available display region of the operating display device is used completely.

A variant is also preferred in which the camera images and the machine operating surface are displayed beside each other as part-images on the operating display device. Owing to the display of the part-images, the service technician or an operator can obtain all the information in a state displayed in parallel on the operating display device and can consequently obtain at a glance an entire overview of the status of the machine. If a plurality of operating ranges are transmitted to the communication device by means of a plurality of cameras, all or a specific number of the different operating ranges and the machine operating surface can be displayed beside each other as part-images on the operating display device. Owing to the illustration as part-images which are arranged beside each other, the part-images are divided or separated from each other. A part-image is intended to be understood to be an image which extends over only a portion of the complete image (the maximum possible complete image).

A method variant is also preferred in which the machine operating surface is radio-transmitted as a display image of a machine operating device which has a machine display. The machine has, for (regular) operation (that is to say, when the machine is not operated remotely), a machine operating device having a machine display for displaying the machine operating surface. Using the displayed machine operating surface, the machine can be operated (for example, by pressing keys illustrated, so-called soft keys). In the event that the machine is operated via the machine operating surface displayed on the communication device, the machine operating device of the machine is deactivated so that a dual operation via a machine operating surface which is displayed on the machine display is impossible.

Another aspect of the invention features a radio-network-capable, in particular WLAN-capable, machine for carrying out the method described above. The machine has a machine operating device which has a machine display for displaying a machine operating surface, at least one camera for detecting at least one operating range of the machine, and a control device which is programmed to transmit the camera images detected by the camera and the machine operating surface via the radio network.

The machine is substantially distinguished by the same advantages as the method described above. The machine may be, for example, a machine tool (for punching and/or for bending) or a laser machine (2D laser cutting, laser pipe cutting, or the like). In some cases, the control device is programmed to transmit the operating range and the machine operating surface via the radio network to the communication device. The camera detects the operating range optically.

In a preferred embodiment of the machine, the at least one camera is connected to the machine via the radio network. In this manner, the camera or cameras can be arranged or positioned at different machine positions to detect one or more operating ranges of the machine in a simple manner. Alternatively, the camera can be connected to the machine via a data cable.

In another preferred embodiment of the machine, the control device is programmed to deactivate the machine operating device when the machine operating surface is transmitted via the radio network. The control device is in particular programmed to deactivate the input on the machine operating device when it is possible to transmit operating commands from the operating display device of the communication device via the radio network to the machine operating surface. In this manner, no undesirable and where applicable dangerous dual operation is possible via the machine operating device and the operating display device of the communication device. The operational safety of the machine is consequently increased.

Another aspect of the invention features a radio-network-capable, in particular WLAN-capable, communication device, in particular for carrying out the method described above. The communication device has an operating display device, in particular an operating display device which is constructed as a touch screen, and a control device which is programmed to receive and display the camera images and the machine operating surface via the radio network.

The communication device is distinguished substantially by the same advantages as the method described above. The control device is in particular programmed to display the camera images and the images of the machine operating surface as complete images on the operating display device, to display them at least partially superimposed on the operating display device, to superimpose them in an at least partially transparent manner on the operating display device, to display them beside each other as part-images on the operating display device, to change them in terms of their image sizes and to change the display position thereof on the operating display device. The control device is further programmed to emit or transmit operating signals entered in the operating display device to the machine via the radio network and to allow the method to run as a computer application on the communication device (application or App. for short).

Other aspects of the invention feature a machine arrangement or system including a machine (e.g., a material processing machine) and a communication device as described above. The communication device is connected to the machine via a radio network. The machine includes a machine operating device having a machine display for displaying a machine operating surface, at least one camera for detecting at least one operating range of the machine, and a control device configured to transmit the camera images detected by the camera and the machine operating surface via the radio network. The communication device includes an operating display device and a control device. The control device is configured to receive, from the machine, the detected camera images and the machine operating surface via the radio network, display at least one of the camera images and the machine operating surface on the operating display device, and transmit one or more operating signals entered in the operating display device for remotely operating the machine via the radio network to the machine.

Other advantages and advantageous embodiments of the subject-matter of the invention will be appreciated from the description, the claims and the drawings. The features mentioned above and those set out below may also be used individually per se or together in any combination. The embodiment shown and described is not intended to be understood to be a conclusive listing but is instead of exemplary character for describing the invention. The Figures of the drawings show the subject-matter in a schematic manner and are not intended to be understood to be to scale.

DESCRIPTION OF DRAWINGS

FIG. 1 is a schematic illustration of an example of a machine and a communication device.

FIG. 2 shows the communication device of FIG. 1, which displays a complete image.

FIG. 3 shows the communication device of FIG. 1, which displays superimposed images.

FIGS. 4a-4c show the communication device of FIG. 1, which displays part-images.

FIG. 5 shows the communication device of FIG. 1, which displays a part-image and a virtual operating keyboard.

DETAILED DESCRIPTION

FIG. 1 shows a machine arrangement 1 having a radio-network-capable machine 2 and a radio-network-capable communication device 3. The machine 2 has a machine operating device 4 having a machine display 5 for illustrating a machine operating surface 6 as a display image of the machine display 5. Via the machine operating surface 6 displayed on the machine display 5, the machine 2, which is constructed, for example, as a machine for 2D laser cutting, for laser pipe cutting, for punching, for punching laser operation or for bending workpieces, can be operated from an operating position. For example, by actuating a soft key 7 of the machine display 5 which is constructed for this purpose as a touch-sensitive screen (touch screen), which soft key is integrated in the machine operating surface 6, machine functions can be actuated (for example, a punching or bending movement of a machine component). The machine 2 further has an access point 9 which is connected by means of a firewall 8 in order to construct a wireless local radio network 10, preferably a so-called WLAN (Wireless Local Area Network).

The machine 2 also includes a camera 11 for detecting at least one operating range 12 of the machine 2. The operating range 12 of the machine 2 is a range of the machine 2 in which a machine function is carried out. Such a machine function is indicated in FIG. 1 merely by way of example by means of a wrench. The camera 11 is connected to the machine 2 by means of a WLAN antenna 13 via the radio network 10. Alternatively, a cable connection 14 may also be provided.

The machine 2 further has a control device 15 which is programmed to transmit camera images 16 detected by the camera 11 and display images 17 of the machine operating surface 6, that is to say, the machine operating surface 6, via the radio network 10 to the communication device 3. The communication device 3 which has an operating display device 18 that is constructed as a touch screen includes itself a control device 19 which is programmed to receive the camera images 16 and the machine operating surface 6 (or display images 17 of the machine operating surface 6) via the radio network 10 and to display them on the operating display device 18.

A method for remotely operating and/or remotely monitoring the machine 2, in particular for maintenance and/or repair of the machine 2, is described below. In a method step, the operating range 12 of the machine 2 is detected by means of the camera 11 of the machine 2. In another method step, the camera images 16 detected by the camera 11 and the machine operating surface 6 illustrated as a display image 17 of the machine display 5 are transmitted to the communication device 3 via radio. In another method step, the camera images 16 and/or the machine operating surface 6 are displayed on the operating display device 18 of the communication device 3 and, in another method step, the machine 2 is remotely operated and/or remotely monitored by means of the operating display device 18. In order to carry out the method, the communication device 3 is connected to the machine 2 by means of the local radio network 10.

The method not only enables the machine 2 to be operated from different machine positions which deviate from the operating position located on the machine operating device 4 using the communication device 3 (remote operation), but at the same time also allows the operating range 12 of the machine 2 to be monitored via the operating display device 18 of the communication device 3 (remote monitoring). It is thereby possible to carry out repair and/or maintenance operations, in particular using a single service technician, from different machine positions in an accelerated manner and nonetheless to obtain an overview of the entire machine 2 or of one or more relevant operating ranges 12 of the machine 2. In order to obtain monitoring of a plurality of operating ranges 12 or an operating range 12 from a plurality of viewing angles, it is possible to accordingly provide a plurality of cameras 11 instead of only one camera 11. In this instance, the cameras 11 are preferably all connected to the machine 2 via the local radio network 10, the respective camera images 16 thereof for display on the operating display device 18 also being transmitted to the communication device 3 via the radio network 10.

In order, during the input of commands via the operating display device 18 of the communication device 3, to prevent dual operation by means of simultaneous input of commands at the machine operating device 4, the control device 15 of the machine 2 is also programmed to deactivate the machine operating device 4 when the machine operating surface 6 is transmitted via the radio network 10. The control device 19 of the communication device 3 is itself also programmed to transmit commands which are input via the operating display device 18 of the communication device 3 for operating the machine 2 via the radio network 10 to the machine 2.

FIG. 2 is a front view of the communication device 3 so that the rectangular form of the operating display device 18 which is constructed as a touch screen can be seen. The camera images 16 transmitted, that is to say, the detected operating range 12, and the transmitted display images 17, that is to say, the machine operating surface 6, can be displayed by means of the operating display device 18 and, at the same time, by touching the operating display device 18 which is constructed as a touch screen, an input of operating commands is possible. In FIG. 2, purely by way of example of a possible machine function which is carried out, a wrench is illustrated in the operating range 12 which is displayed as a complete image on the operating display device 18. Alternatively, the machine operating surface 6 may also be displayed as a complete image on the operating display device 18 (not illustrated). An operator or service technician, using an input command, may switch between the display of the camera images 16 as a complete image and the display of the machine operating surface 6 as a complete image.

In FIG. 3, the camera images 16 detected by the camera 11, that is to say, the operating range 12, and the machine operating surface 6 which is transmitted via the display images 17, are displayed in a state superimposed on the operating display device 18. The operating range 12 shown is in this instance arranged in the background, the machine operating surface 6 being superimposed in a transparent manner (for example, indicated by the dashed edge of the machine operating surface 6 displayed). The degree of transparency of the superimposed illustration is preferably variable, from complete overlapping to complete transparency, and adjustable in a stepless manner.

In order to remotely operate the machine 2, an operator may, for example, actuate manually or by means of a pin the soft key 7 integrated in the machine operating surface 6 displayed in order to actuate a machine function (for example, punching, bending, cutting, etc.) on the machine 2. The remote monitoring of the machine 2 or the corresponding operating ranges 12 is possible by observing the camera images 16 illustrated on the operating display device 18.

Alternatively, the machine operating surface 6 may be illustrated as a complete image and the camera images 16 as part-images which are smaller in comparison in a state superimposed in a transparent manner on the operating display device 18. The machine operating surface 6 is then preferably arranged in the background so that the machine operating surface 6 can be operated directly in the ranges not superimposed by the camera images 16. The camera images 16 of the illustrated operating range 12 may, for example, be displaced by touching the camera images 16 on the operating display device 18 which is constructed as a touch screen and moving the contact location so that the camera images 16 no longer overlap ranges of the machine operating surface 6 and the machine operating surface 6 can be operated in these ranges which are no longer overlapped. In particular, the size of the camera images 16 illustrated can be changed, for example, by means of a touch gesture with two fingers (Pinch-to-Zoom).

In FIGS. 4a to 4c, the camera images 16 and the machine operating surface 6 are displayed beside each other as part-images on the operating display device 18. In this instance, the images sizes can preferably be changed (cf. different image sizes of the camera image 16 and the machine operating surface 6). The service technician can thereby enlarge and consequently observe more precisely details which are of greater interest to him or reduce a display which is of less interest to him so that it is moved to the background of the operating display device 18. Image sizes are intended to be understood to refer to both the image size of a complete image and the image size of a part-image or the image size of superimposed images. In this instance, it may involve the camera images 16 displayed, that is to say, the operating range 12, and/or the display images, that is to say, the machine operating surface 6. The image sizes may be enlarged and/or reduced in each case. Preferably, the size relationships of the images displayed can be adapted to each other. Consequently, the maximum available size of the operating display device 18 can be used completely.

Preferably, the display positions of the camera images 16 and/or the machine operating surface 6 can be changed on the operating display device 18. The service technician can thereby displace the displayed camera image 16 and/or the machine operating surface 6 at personally preferred display positions on the operating display device 18 (for example, via a manual finger movement or gesture) and consequently benefit from a user-specific adaptation of the communication device.

In FIG. 4a, the operating display device 18 is subdivided into a main operating surface 20 and a menu operating surface 21. The menu operating surface 21 may, for example, be opened by means of a key which is not illustrated (and which is, for example, constructed as an additional soft key) or be opened by a swiping gesture. The machine operating surface 6 is generally illustrated on the main operating surface 20. The camera images 16 are preferably displayed in the menu operating surface 21. It is, for example, possible to move the camera images 16 displayed in the menu operating surface 21 using the swiping gesture from the menu operating surface 21 (FIG. 4a) into a position according to FIG. 4b or 4c. Furthermore, the camera images 16 displayed can be moved in this manner into the superimposed display mode according to FIG. 3. If a camera image 16 is released during the swiping gesture, that is to say, if the swiping gesture is interrupted, the control unit 19 of the communication device 3 is programmed to move into a probable display mode.

FIG. 5 finally shows the operating display device 18 in which, on the one hand, the camera image 16 (or continuously a plurality of camera images 16) and, on the other hand, a virtual keyboard 22 (a keyboard which is composed of a plurality of soft keys) are displayed. Via the virtual keyboard 22, extensive inputs into the operating display device 18 of the communication device 3 can be carried out. For example, service technicians can in this manner record service operations and store them in a store of the communication device 3.

A number of embodiments of the invention have been described. Nevertheless, it will be understood that various modifications may be made without departing from the spirit and scope of the invention. Accordingly, other embodiments are within the scope of the following claims.

What is claimed is:

1. A method of remotely operating a material processing machine using a remote communication device, the method comprising:
transmitting a graphical user interface generated electronically by a machine operating device and displayed on a machine display of the machine to the remote communication device via a local radio network of the machine, the machine configured to be operated from a local operating position via the graphical user interface displayed on the machine display of the machine;
displaying the graphical user interface on an operating display of the remote communication device;
accepting machine operation commands input by an operator using the graphical user interface displayed on the operating display of the remote communication device; then
transmitting the machine operation commands via the local radio network, thereby remotely operating the machine;
generating images showing at least one processing range of the machine using at least one camera of the machine and transmitting the generated images to the remote communication device via the local radio network of the machine; and
displaying both the graphical user interface and at least one of the generated images on the operating display of the remote communication device at the same time,
wherein the at least one processing range of the machine is different from the graphical user interface displayed on the machine display.

2. The method of claim 1, wherein the machine operation commands are selected to perform at least one of a repair operation and a maintenance operation based on a review of images displayed on the operating display.

3. The method of claim 1, wherein generating images showing at least one processing range of the machine comprises:
generating a plurality of images showing multiple processing ranges of the machine using a plurality of cameras positioned at respective machine positions.

4. The method of claim 1, wherein generating images showing at least one processing range of the machine comprises:
generating images from a plurality of viewing angles using a plurality of cameras positioned at various machine positions.

5. The method of claim 1, wherein the local radio network is a machine-integrated wireless local area network (WLAN), and wherein the image of the graphical user interface surface of the machine is transmitted to the remote communication device by virtual network computing (VNC) protocol.

6. The method of claim 1, further comprising remotely monitoring a status of the machine using the operating display of the remote communication device.

7. The method of claim 1, wherein the at least one of the generated images and the graphical user interface are displayed as complete images on the operating display.

8. The method of claim 1, wherein the at least one of the generated images is displayed at least partially superimposed with the graphical user interface on the operating display.

9. The method of claim 8, wherein the at least one of the generated images and the graphical user interface are superimposed at least in a partially transparent manner.

10. The method of claim 1, wherein the at least one of the generated images and the graphical user interface are displayed beside each other as partial images on the operating display.

11. The method of claim 1, wherein the graphical user interface is transmitted as an image displayed on a display of an operating device of the machine.

12. The method of claim 11, further comprising:
deactivating the operating device of the machine upon transmitting the graphical user interface to the remote communication device via the local radio network.

13. A material processing machine comprising:
a machine operating device for controlling local operation of the machine, the machine operating device having a machine display for displaying a graphical user interface of the machine, the machine configured to be operated from a local operating position via the graphical user interface displayed on the machine display;
a controller configured to:
transmit data representing the graphical user interface that is electronically generated by the machine operating device to a remote communication device over a local radio network of the machine, and
receive machine control commands from the remote communication device over the local radio network; and
at least one camera configured to generate images showing at least one processing range of the machine, the at least one processing range of the machine being different from the graphical user interface displayed on the machine display,
wherein the controller is configured to transmit at least one of the generated images to the remote communication device over the local radio network of the machine.

14. The machine of claim 13, wherein the camera is connected to the controller via the local radio network.

15. The machine of claim 13, wherein the controller is configured to deactivate the machine operating device upon transmitting the data representing the graphical user interface to the remote communication device.

16. The machine of claim 13, comprising one of a two-dimensional (2D) laser cutting machine, a laser pipe cutting machine, a punching machine, and a workpiece bending machine.

17. The method of claim 1, wherein the material processing machine comprises one of a two-dimensional (2D) laser cutting machine, a laser pipe cutting machine, a punching machine, and a workpiece bending machine.

18. The machine of claim 13, wherein the local radio network is a machine-integrated wireless local area network (WLAN), and
wherein the data representing the graphical user interface is transmitted to the remote communication device by virtual network computing (VNC) protocol.

* * * * *